(12) United States Patent
Nilson

(10) Patent No.: US 6,798,105 B1
(45) Date of Patent: Sep. 28, 2004

(54) ELECTRICAL MACHINE WITH A WINDING

(75) Inventor: Thord Agne Gustaf Nilson, Tyresö (SE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 16 days.

(21) Appl. No.: 10/129,091

(22) PCT Filed: Nov. 9, 2000

(86) PCT No.: PCT/BE00/00135
§ 371 (c)(1),
(2), (4) Date: Aug. 13, 2002

(87) PCT Pub. No.: WO01/35514
PCT Pub. Date: May 17, 2001

(30) Foreign Application Priority Data

Nov. 9, 1999 (EP) .............................. 99870234

(51) Int. Cl.[7] .................................................. H02K 3/00
(52) U.S. Cl. ....................................... 310/179; 310/64
(58) Field of Search .......................... 310/179, 52, 54, 310/64

(56) References Cited

U.S. PATENT DOCUMENTS

| | | | |
|---|---|---|---|
| 4,123,679 A | 10/1978 | Miyasaka | ..................... 29/596 |
| 4,337,567 A | 7/1982 | Lugosi et al. | ................ 310/266 |
| 4,994,700 A | * 2/1991 | Bansal et al. | ................ 310/215 |
| 6,281,612 B1 | * 8/2001 | Asao et al. | .................. 310/179 |

FOREIGN PATENT DOCUMENTS

| | | | |
|---|---|---|---|
| DE | 496884 | 4/1930 | |
| DE | 3241506 | 5/1984 | ............ H02K/3/24 |
| EP | 519679 | 12/1992 | ............ H02K/3/04 |

OTHER PUBLICATIONS

English translation for DE 496 844.*

* cited by examiner

Primary Examiner—Dang Le
Assistant Examiner—Nguyen Hanh
(74) Attorney, Agent, or Firm—Bacon & Thomas, PLLC

(57) ABSTRACT

The invention relates to an electrical machine with a winding (5) comprising a wire (8) consisting of individually insulated conductors (9), these conductors being wires or strands, characterized in that the insulated conductors (9) extend in a zigzag pattern between the edges of the winding (5) said edges being in thermal conductive contact with a cooling medium.

11 Claims, 1 Drawing Sheet

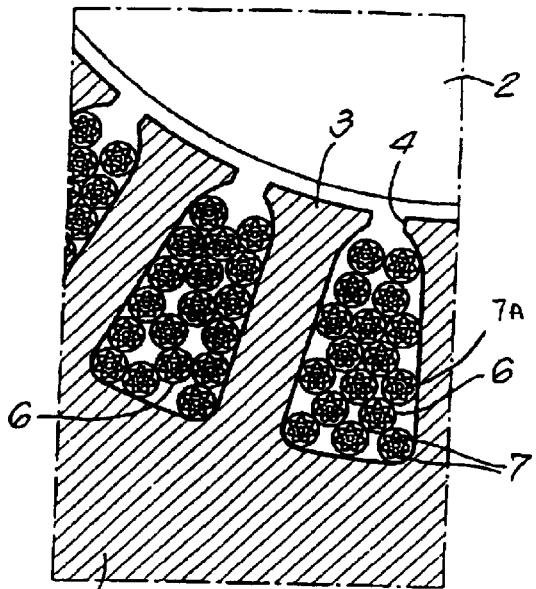
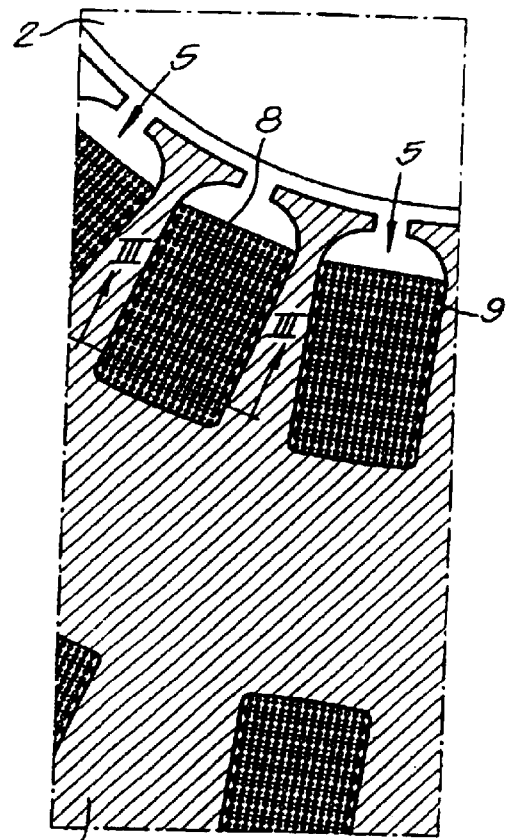
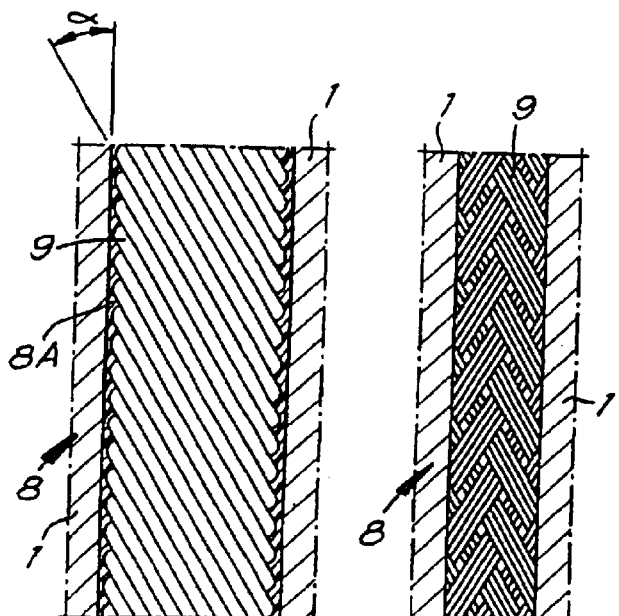
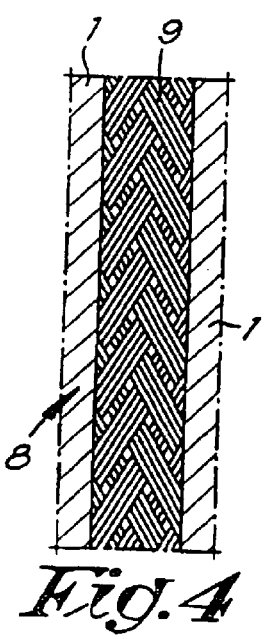
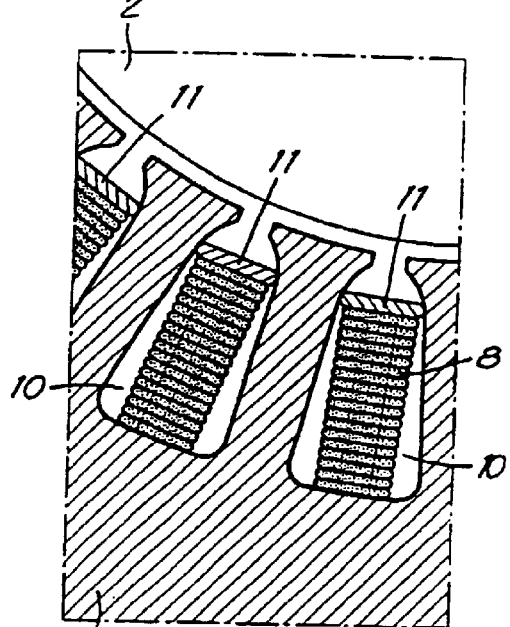

ELECTRICAL MACHINE WITH A WINDING

BACKGROUND OF THE INVENTION

This invention relates to an electrical machine, more particularly a motor or a generator, with a winding comprising a winding wire consisting of individually insulated conductors, these conductors being wires or strands.

This kind of wire is commonly known as Litz winding wire.

Such windings are for instance placed around the teeth of the stator or in grooves in the stator, which teeth or grooves extend parallel to the rotation axis of the rotor.

In known motors or generators, the conductors of the winding wire of the winding extend parallel to each other or are twisted in small bundles, which extend parallel to each other. These small bundles may for instance consist of Litz wires having twisted or braided wires, the winding wire comprising several of such Litz wires which extend parallel to each other.

The heat conduction of the winding perpendicular to the direction of the winding is very small compared to the heat-conduction of copper. Therefore the winding is often impregnated with special materials to increase the thermal conductivity, but even then the thermal conductivity in transversal direction of the winding is relatively small and the possible cooling of the winding is limited.

EP-A-0.519.679 discloses a tubular three-phase armature winding, the wire used for the winding comprising parallel flat conductors. The winding wire extends in zigzag between the both ends of the motor, but in a traverse section of the winding wire, the conductors are adjacent to each other in the traverse direction and these conductors extend parallel to each other in the longitudinal direction of the winding wire. This document define a very space efficient winding arrangement but does not mention any cooling and the winding has the same limited cooling possibility as the above mentioned known motors and generators.

The lack of sufficient cooling of the winding may constitute a limit to the speed of the motor or generator.

SUMMARY OF THE INVENTION

The invention seeks to provide an electrical machine with a winding having an increased cooling.

In accordance with the invention, this object is accomplished in that the conductors of the winding wire extend inside the wire in a zigzag pattern under angles with respect to the mean longitudinal direction of the winding wire, between the edges of the winding wire, said edges being in thermal conductive contact with a cooling medium.

In a section perpendicular to the winding, and in the transversal direction there is only one winding wire with in zigzag extending insulation conductors.

By the zigzag pattern, the heat can be transferred along the conductors to the edge of the winding and so to the cooling medium instead of having to jump through the insulation from one conductor to the other and the heat may be dissipated laterally to a much greater extent than when the conductors are parallel.

DE-C-496.884 discloses a method for manufacturing a winding wire wherein the conductors extend from on edge of the wire to the other. However this document does not disclose how such wire is used in a winding. Nothing is suggested that the edges of the wire are also the edges of the winding and are in thermal conductive contact with a cooling medium. On the contrary, with the purpose of cooling, the winding wire may be hollow, comprising thus a channel for cooling air.

According to the invention, the zigzag pattern may be under angles between 5° and 45° and preferably between 10° and 30° with respect to the mean longitudinal direction of the winding.

More particularly, the winding wire may consist of a wire formed by a flat and wide packet of insulated conductors, each conductor extending in zigzag from one side of the packet to the other.

The winding may be in heat conductive connection with a solid heat conducting material, for instance the iron of a stator, in which case the cooling medium consists of this heat conducting material.

The winding may be situated in a channel in a stator, whereby in a form of embodiment, space is left open in the channel, which space is filled with a liquid or gaseous cooling medium, for instance transformer oil.

The winding wire may be impregnated with a suitable varnish so that the winding becomes self-supporting. In this case, the winding may be used in an air-wound motor and the cooling medium may be gaseous.

BRIEF DESCRIPTION OF THE DRAWINGS

The invention will now be described by way of example and with reference to the accompanying drawings, in which:

FIG. 1 is a sectional view of a part of an electrical motor with a prior art winding with Litz wire;

FIG. 2 is a sectional view similar to that of FIG. 1, but with a winding according to the invention;

FIG. 3 represents a section along line III—III in FIG. 2;

FIG. 4 represents a section similar to that of FIG. 3, but with respect to another form of embodiment of the winding wire;

FIG. 5 is a sectional view similar to that of FIG. 2, but with respect to another embodiment of the winding according to the invention.

DETAILED DESCRIPTION OF THE INVENTION

FIG. 1 shows a portion of a prior art motor comprising a stator 1 surrounding a rotor 2.

The inner side of the stator 1 is provided with teeth 3 between which channels 4 are formed. A coil or winding 5 with a Litz wire 6 is present in each of these channels 4.

The Litz wire 6 consists of a number of individually insulated conductors 7 surrounded by an insulating envelope 7A.

In another embodiment, the Litz wire 6 may consist of a number of bundles of magnet wire surrounded by an insulating envelope.

In both embodiments, the insulating envelope is not absolutely necessary.

In both embodiments, the wire 6 is wound several times around the stator 1 so that several portions of said wire lie as well adjacent to each other as one above the other. In the transversal direction of the winding several portions of the wire are adjacent and none of the portions is extends simultaneously to both lateral sides of the winding.

This means that heat may very difficultly be dissipated from the conductors 7 situated inside the Litz wire 6. The heat has to jump laterally from conductor to conductor and further from one Litz wire 6 to another to reach the outer surface or edge of the winding 5 an thus the channel 4.

The motor shown in FIG. 2 only differs from the one shown in FIG. 1 by a design of the winding 5, which is according to the invention.

The winding 5 consists also of a wire 8 comprising a number of individually insulated conductors 9, but these conductors 9 are extending in zigzag in their channel 4 so that each conductor 9 regularly reaches the outer surface or edge of the winding 5. The conductors 9 may be single wires as shown in FIGS. 2 and 3 or may be strands or bundles.

The zigzag pattern is under angles a between 5° and 45°, preferably between 10° and 30° with respect to the mean longitudinal direction of the winding 5 and the wire 8.

The conductors 9 may be included in a flat and wide packet with nearly rectangular section as represented in FIGS. 2 and 3, each of the conductors 9 reaching from one side of the packet to the other side, e.g. in the form of a plait.

The packet constituting the wire 8 is as large as the channel 4 and the lateral edges of the packet touch the wall of the channel 4, this is the iron of the stator 1.

There may also be a thin electrical insulation between the wall of the channel 4 and the winding 5, whereby the insulation is so thin that thermal conduction from the conductors 9 towards the wall of the channel 4, which are in heat conducting material of the stator 1, mostly iron, is not prevented.

The packet of insulated conductors 9 may for instance be surrounded by an envelope BA of electrical insulating material, as shown in the FIGS. 2 and 3.

In fact the wire 8 may be considered as a flattened Litz wire.

Tests have shown that the heat conductivity of the winding 5 with winding wire 8 according to the invention with conductors 9 zigzagging from one edge of the winding to the other, is more than ten times that of the winding 5 according to FIG. 1 with parallel standard Litz wires.

Thermal paste may be used to improve the cooling of the winding 5 against the iron of the stator 1 or another cold wall.

In another embodiment, the conductors 9 are not held together by an envelope 9A but may be held together in the packet by forming a braid or plait, in which case the envelope may be omitted. This could still improve the heat dissipation. FIG. 4 shows such embodiment.

Another embodiment of the motor according to the invention is shown in FIG. 5. In this case the edges of the winding 5 do no longer touch the walls of the channel 4 and the iron of the stator 1. A space 10 is left in the channel 4 on both sides of the winding 5. This space 10 is filled with a liquid cooling medium such as transformer oil.

Spacers 11 are provided in the channel 4 to keep the winding 5 in the correct position.

This can also be accomplished by impregnating the winding wire 8 by a suitable varnish, whereby the winding 5 becomes self-supporting and thus suitable for air-gap wound motors.

In this case the cooling medium may be gaseous, for instance air blown between the windings 5.

In the embodiment of FIG. 5, the heat conductivity is even higher than in the embodiment of FIGS. 2 and 3.

The zigzag pattern of the conductors 9 of the embodiments of FIGS. 2 to 5 according to the invention permit the heat to transfer along the copper conductors towards the edge of the winding 5 and from there to the solid, liquid or gaseous cooling medium.

The electrical machine must not necessarily be a motor. It may for example be a generator.

What is claimed is:

1. Electrical machine comprising a winding including winding wire comprising individually insulated conductors, said conductors further comprising wires or strands, wherein the insulated conductors extend inside the winding in a zigzag pattern at angles with respect to the mean longitudinal direction of the winding, between the edges of the winding, said edges being in thermal conductive contact with a cooling medium.

2. Electrical machine according to claim 1, wherein the zigzag pattern extends at angles between 5° and 45° with respect to the mean longitudinal direction of the winding.

3. Electrical machine according to claim 1, wherein the zigzag pattern extends at angles between 10° and 30° with respect to the mean longitudinal direction of the winding.

4. Electrical machine according to claim 3, wherein the winding wire is a Litz wire.

5. Electrical machine according to claim 1, wherein the winding comprises a winding wire formed by a flat and wide packet of insulated conductors, each conductor extending in zigzag from one side of the packet to the other.

6. Electrical machine according to claim 5, wherein the winding comprises a winding wire in the form of a packet of insulated conductors extending zigzag in the form of a plait or braid.

7. Electrical machine according to claim 1, wherein the winding is situated in a channel.

8. Electrical machine according to claim 1, wherein the winding is in heat conductive connection with a solid heat conducting material, for example the iron of a stator, in which case the cooling medium comprises said heat conducting material.

9. Electrical machine according to claim 1, wherein the winding is located in a channel, a space being left open in the channel, which space is filled with a gaseous or liquid cooling medium such as transformer oil.

10. Electrical machine according to claim 1, wherein the winding is impregnated with a suitable varnish so that it becomes self-supporting.

11. Electrical machine according to claim 1, wherein the winding is used in an air-gap wound motor and the cooling medium is gaseous or liquid.

* * * * *